United States Patent
Kalakkunnath et al.

(10) Patent No.: US 8,258,363 B2
(45) Date of Patent: Sep. 4, 2012

(54) SEPARATION OF AROMATICS WITH PERVAPORATION MEMBRANE

(75) Inventors: Sumod Kalakkunnath, Bartlesville, OK (US); Richard L. Anderson, Montreal (CA); James A. Anderson, legal representative, Montreal (CA); Richard D. Sadok, Bartlesville, OK (US); Prakash A. Karpe, Walnut Creek, CA (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 13/238,974

(22) Filed: Sep. 21, 2011

(65) Prior Publication Data

US 2012/0074043 A1 Mar. 29, 2012

Related U.S. Application Data

(60) Provisional application No. 61/386,881, filed on Sep. 27, 2010.

(51) Int. Cl.
*C07C 7/144* (2006.01)
(52) U.S. Cl. .......................... 585/818; 585/819; 585/804
(58) Field of Classification Search ........................ None
See application file for complete search history.

(56) References Cited

U.S. PATENT DOCUMENTS

| | | | |
|---|---|---|---|
| 2,970,106 A * | 1/1961 | Binning et al. | 208/347 |
| 4,861,628 A | 8/1989 | Schucker | |
| 4,879,044 A | 11/1989 | Feimer et al. | |
| 4,885,096 A | 12/1989 | Black | |
| 4,914,064 A | 4/1990 | Schucker | |
| 4,929,357 A | 5/1990 | Schucker | |
| 5,120,900 A * | 6/1992 | Chen et al. | 585/804 |
| 5,254,795 A | 10/1993 | Boucher et al. | |
| 5,670,052 A | 9/1997 | Ho et al. | |
| 5,914,435 A | 6/1999 | Streicher et al. | |
| 7,642,393 B2 * | 1/2010 | Wang et al. | 585/819 |
| 8,177,965 B2 * | 5/2012 | Leta et al. | 208/308 |
| 2006/0289352 A1 | 12/2006 | Yeager et al. | |
| 2008/0035566 A1 | 2/2008 | Sabottke et al. | |
| 2008/0086021 A1 | 4/2008 | Wang et al. | |

* cited by examiner

*Primary Examiner* — Tam M Nguyen
(74) *Attorney, Agent, or Firm* — Phillips 66 Company

(57) ABSTRACT

Methods and apparatus relate to separating and removing aromatic compounds from a hydrocarbon stream. Splitting of the hydrocarbon stream into constituents as desired relies on a membrane and distillation columns that supply feed into the membrane and receive retentate and permeate streams output from the membrane. Configurations employing the membrane and the distillation columns enable benzene recovery and facilitate efficient separation.

20 Claims, 3 Drawing Sheets

SEPARATION OF AROMATICS WITH PERVAPORATION MEMBRANE

CROSS-REFERENCE TO RELATED APPLICATIONS

This application is a non-provisional application which claims the benefit of and priority to U.S. Provisional Application Ser. No. 61/386,881 filed Sep. 27, 2010, entitled "Separation of Aromatics with Pervaporation Membrane," which is hereby incorporated by reference in its entirety.

STATEMENT REGARDING FEDERALLY SPONSORED RESEARCH OR DEVELOPMENT

None

FIELD OF THE INVENTION

Embodiments of the invention relate to splitting of aromatic-containing streams based on constituents therein.

BACKGROUND OF THE INVENTION

Petroleum refineries produce hydrocarbon streams that contain aromatics such as benzene. However, government regulations limit quantity of the benzene in products including gasoline. Benzene content comes from both synthesis of the benzene during refining and natural occurrence of the benzene in production.

Techniques used to reduce amount of the benzene synthesized fail to provide the benzene content as low as desired. Therefore, benzene, toluene, and xylene (BTX) splitters provide for removal of the benzene, which may then be converted or used as an intermediary to make other chemicals. Commercial application of any process associated with recovery of the benzene depends on costs. Prior BTX splitters utilize procedures with undesirable costs due to being complex, energy intensive and capital intensive.

Therefore, a need exists for methods and systems for splitting of aromatic-containing streams based on constituents therein.

BRIEF SUMMARY OF THE DISCLOSURE

In one embodiment, a method includes passing a hydrocarbon stream through a first distillation column to separate a first fraction containing aromatics from a second fraction and passing the first fraction through a membrane unit to generate a retentate stream and a permeate stream with higher benzene content than the retentate stream. Passing the retentate stream through a second distillation column provides first fractionated outputs with one further concentrated in toluene relative to the retentate stream. Further, passing the permeate stream through a third distillation column provides second fractionated outputs with one further concentrated in benzene relative to the permeate stream.

According to one embodiment, a method includes passing a hydrocarbon stream through a first distillation column to separate a top fraction containing aromatics from a bottom fraction and passing the top fraction through a membrane unit to generate a retentate stream and a permeate stream with higher benzene content than the retentate stream. The method further includes passing the retentate stream through a second distillation column for overhead removal of benzene such that remaining output of the second distillation column is further concentrated in toluene relative to the retentate stream. In addition, the method includes passing the permeate stream through a third distillation column for overhead removal of components lighter than benzene such that remaining output of the third distillation column is further concentrated in benzene relative to the permeate stream.

For one embodiment, a method includes passing a hydrocarbon stream through a first distillation column to separate a bottom fraction containing aromatics from a top fraction and passing the bottom fraction through a membrane unit to generate a retentate stream and a permeate stream with higher benzene content than the retentate stream. The method also includes passing the retentate stream through a second distillation column for overhead removal of toluene concentrated relative to the retentate stream due to separation from remaining output of the second distillation column. Further, the method includes passing the permeate stream through a third distillation column for overhead removal of benzene concentrated relative to the permeate stream due to separation from remaining output of the second distillation column.

BRIEF DESCRIPTION OF THE DRAWINGS

A more complete understanding of the present invention and benefits thereof may be acquired by referring to the following description taken in conjunction with the accompanying drawings.

DETAILED DESCRIPTION

Figure 1:
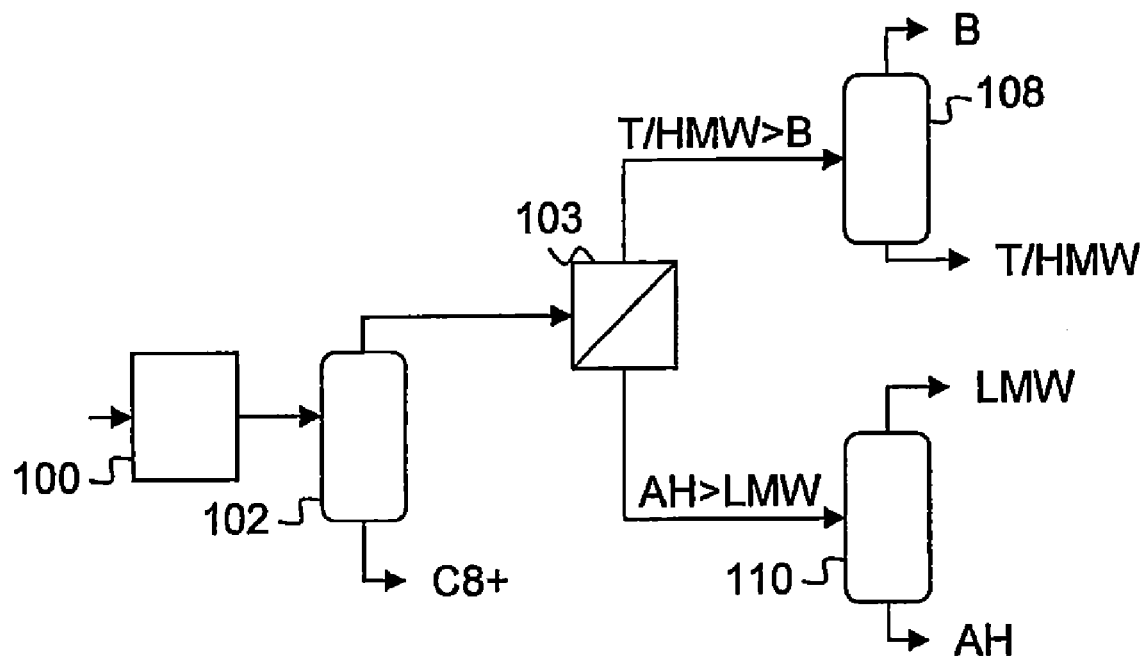
FIG. 1 is a schematic of a separation system for benzene recovery using a membrane unit having both outputs coupled to distillation columns with operation facilitated by the membrane unit, according to one embodiment of the invention.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Embodiments of the invention relate to separating and removing aromatic compounds from a hydrocarbon stream. Splitting of the hydrocarbon stream into constituents as desired relies on a membrane and distillation columns that supply feed into the membrane and receive retentate and permeate streams output from the membrane. Configurations employing the membrane and the distillation columns enable benzene recovery and facilitate efficient separation.

The membranes utilized in membrane units described herein include one or more pervaporation membranes and/or at least one nanofiltration membrane. Permeate refers to flow that goes through the membranes in contrast to flow that does not go through the membranes and is referred to as retentate.

The membranes in the membrane units may define modules with the membranes being spirally wound, hollow-fiber or plate and frame.

Typical types of the membranes suitable for use in some embodiments include polymeric membranes. Examples of such polymeric membranes include copolymers, homopolymers, oligomers and other polymer blends and may be made of polyimides, polyacrylonitriles, polyurethanes, polyacrylates, polybutadienes, polydimethylsiloxanes and combinations thereof. Material selected for the pervaporation membrane provides selective passage through the membrane of aromatics relative to aliphatics or of benzene relative to other aromatics. Such membranes have been shown to have selectivity for aromatics to aliphatics and for benzene to compounds including toluene that are heavier than benzene. In some embodiments, the nanofiltration uses a membrane that has a maximum pore size, such as below 100 nanometers, for selective passage through the membrane based on molecular size.

The hydrocarbon stream to be treated contains a mixture of aromatic and aliphatic compounds that in some embodiments have between about 5 and 10 carbon atoms. Examples of the hydrocarbon stream include naphtha steam-cracking effluent, reformer effluent, pygas, or coke oven light oil. In some embodiments, the hydrocarbon stream contains an initial concentration of benzene between 1% and 30% by weight.

Embodiments described herein enable recovery of the benzene from the hydrocarbon stream and may further provide for toluene and/or xylene recovery. Benzene streams recovered as described herein may contain at least 95% benzene by weight or at least 99% benzene by weight. Further, recovery of the benzene streams or aromatic streams may result in other remaining fluid streams having a benzene content of less than 5% by weight, less than 2% by weight or less than 1% by weight.

FIG. 1 illustrates a separation system for benzene recovery. A reformer 100 supplies a reformate stream to the system that includes a first distillation column 102 and a membrane unit 103 having a retentate output coupled to a second distillation column 108 and a permeate output coupled to a third distillation column 110. A feed stream input into the reformer 100 catalytically reacts in the reformer to produce the reformate stream input into the first distillation column 102. The reformer 100 may utilize catalyst compositions that include platinum and/or rhenium on a support, such as silica or silica-alumina.

The first distillation column 102 separates the reformate stream into a top cut of vapor or overhead and a bottom cut of liquids. The first distillation 102 column thus separates $C_7$ and lighter compounds (C7−) from $C_8$ and heavier compounds (C8+). The top cut contains aromatics including benzene and toluene. This removal of the benzene with the top cut enables use of the bottom cut as stock for a fuel or gasoline pool. If present and desired to recover, xylene may be extracted from the bottom cut through a separate distillation.

The top cut passes to the membrane unit 103 for rough splitting to concentrate aromatics in a permeate stream output from the membrane unit 103 relative to a retentate stream output from the membrane unit 103. In some embodiments, the permeate stream contains at least about 80% aromatic content. Concentration of benzene or total aromatics (AH) in the permeate stream may be greater than constituents with lower molecular weights (LMW) relative to benzene. The rough splitting also provides the retentate stream with a greater concentration of constituents including toluene (T) with other molecules having higher molecular weights (HMW) than benzene (B).

The retentate stream passes from the membrane unit 103 to the second distillation column 108 where the benzene is removed as overhead such that remaining output of the second distillation column is further concentrated in toluene with the other molecules having higher molecular weights than benzene relative to the retentate stream. This remaining output of the second distillation column 108 may mix with the stock for the fuel or gasoline pool. The rough splitting of the membrane unit 103 facilitates the benzene removal with the second distillation column 108 by limiting amount of benzene in the second distillation column 108 and thereby amount of energy needed for vaporization of the benzene to achieve desired separation.

The permeate stream passes from the membrane unit 103 to the third distillation column 110 where the constituents with lower molecular weights relative to benzene are removed as overhead such that remaining output of the third distillation column 110 is further concentrated in benzene and other aromatics relative to the permeate stream. The constituents with lower molecular weights relative to benzene output from the third distillation column 110 may mix with the stock for the fuel or gasoline pool. If not separated by the third distillation column 110, further fractionating of the aromatics recovered with the third distillation column 110 may provide benzene-toluene splitting. Again, the rough splitting of the membrane unit 103 facilitates the removal of the constituents with lower molecular weights relative to benzene using the second distillation column 110 by limiting amount thereof in the third distillation column 110 and thereby amount of energy needed for vaporization to achieve desired separation. In some embodiments, these fractionated outputs from the second and third distillation columns 108, 110 include the vapor overheads formed of less than 20% by weight of respective ones of the retentate and permeate streams.

In some embodiments, configuration of the system avoids expense associated with solvent extractions during processing to recover the benzene. For example, the reformate exits the reformer 100 and passes through the first distillation column 102, the membrane unit 103 and the second and third distillation columns 108, 110 without passing through an aromatics extraction unit. In contrast to reliance on use of aromatic extraction solvents following an initial membrane separation, the system combines distillation prior to the rough splitting by the membrane unit 103 with distillation of both outputs from the membrane unit 103 to achieve desired results.

Figure 2:
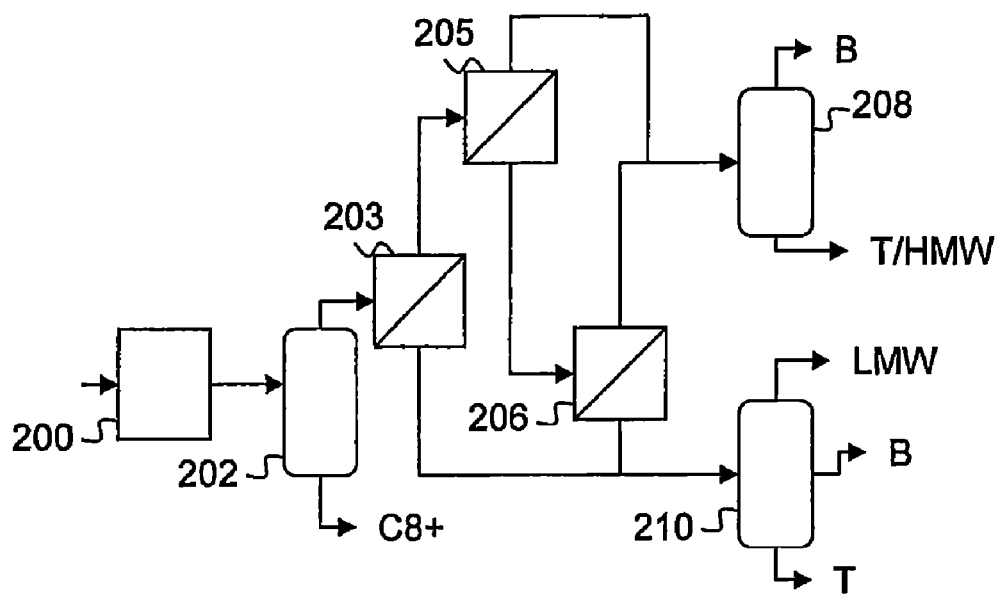
FIG. 2 is a schematic of a separation system illustrating an exemplary membrane unit configuration, according to one embodiment of the invention.

FIG. 2 shows a separation system with a reformer 200 and having a first distillation column 202 arranged to feed a membrane unit with an exemplary configuration that includes a first pervaporation subunit 203, a second pervaporation subunit 205 and a nanofiltration subunit 206. Various arrangements of multiple membranes whether alike or different to further concentrate intermediate retentate and/or permeate from previous membranes enables concentrating of aromatic and/or benzene contents to desired levels in final retentate and permeate streams of the membrane unit. Further, the nanofiltration subunit 206 may provide a rougher cut of aromatic to aliphatic separation than pervaporation separation but may be cheaper and hence employed at appropriate locations for economic reasons. The system further includes a second distillation column 208 and a third distillation column 210.

In operation, the first distillation column 202 fractionates a reformate stream from the reformer 200 and provides a C7− fraction to the first pervaporation subunit 203. Retentate from the first pervaporation subunit 203 flows to the second pervaporation subunit 205, which treats less fluid than the first pervaporation subunit 203 that may thus be bigger. Permeate from the second pervaporation subunit 205 passes through to the nanofiltration subunit 206. Each of the second pervaporation subunit 205 and the nanofiltration subunit 206 concentrates aromatics in flows that pass through each relative to the retentate of the first pervaporation subunit 203. A final permeate stream includes combined permeate that passes through pervaporation and nanofiltration membranes of the first pervaporation subunit 203 and the nanofiltration subunit 206. A final retentate stream includes combined retentate from the second pervaporation subunit 205 and the nanofiltration subunit 206.

The second distillation column 208 receives the final retentate stream for overhead removal of benzene from residual constituents including toluene with molecules having higher molecular weights than benzene. The third distillation column 210 receives the final permeate stream for overhead separation of constituents having a lower molecular weight than benzene. An intermediate cut removed from the third distillation column 210 may recover benzene. A bottom cut removed from the third distillation column 210 may recover toluene.

Figure 3:
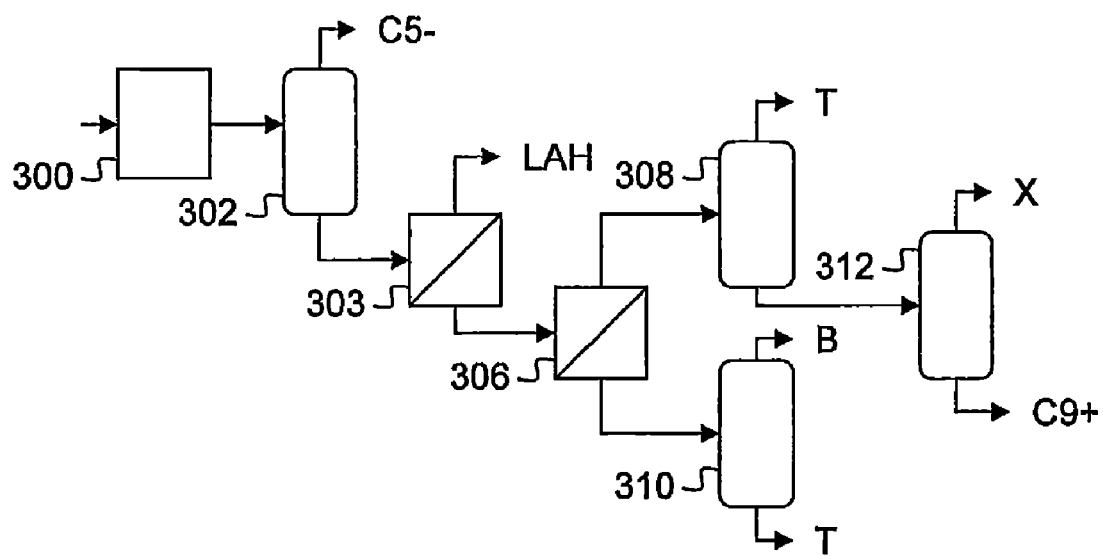
FIG. 3 is a schematic of a separation system illustrating a membrane unit configured to facilitate benzene-toluene splitting, according to one embodiment of the invention.

FIG. 3 illustrates a reformer 300 supplying reformate to a separation system with membrane facilitated benzene-toluene splitting. The system includes a distillation column 302, a first membrane unit 303, a second membrane unit 306, a TX splitter 308, a BT splitter 310, and a xylene splitter 312. As with other embodiments described herein, rough cut separation with the second membrane unit 306 facilitates economic operation of subsequent distillation by limiting reboiler duty, column size and steam requirements.

The distillation column 302 separates the reformate into a top cut of $C_5$ and lighter compounds (C5−) suitable for blending into fuels and a bottom cut of $C_6$ and heavier compounds (C6+). In some embodiments, the bottom cut includes about 50 volume % aromatics. The first membrane unit 303 receives the bottom cut from the distillation column 302 and produces a first permeate rich in aromatics relative to a first retentate. The first retentate thus aliphatic (and lean in aromatics or LAH) may mix with stock for a fuel or gasoline pool. The first permeate passes through to the second membrane unit 306 that produces rough cut separation of benzene from toluene. The second membrane unit 306 generates a second retentate stream and a second permeate stream with higher benzene content than the second retentate stream. The second permeate stream from the second membrane unit 306 however still contains a mixture of benzene and toluene due to roughness of membrane separation.

The second retentate stream from the second membrane unit 306 passes to the TX splitter 308 for distillation to recover overhead concentrated in toluene relative to the second retentate stream due to separation from remaining output of the TX splitter 308. The second permeate stream from the second membrane unit 306 passes to the BT splitter 310 for distillation to recover overhead concentrated in benzene relative to the second permeate stream due to separation from remaining output of toluene from the BT splitter 310. Recovery of the toluene thereby includes combination of the overhead from the TX splitter 308 and bottom fluids recovered from the BT splitter 310.

The xylene splitter 312 further processes bottom fluids recovered from the TX splitter 308. Distillation with the xylene splitter 312 produces overhead of xylene recovered from $C_9$ and heavier compounds (C9+) also output from the xylene splitter 312. Corresponding to other membrane based techniques described herein, such BTX separation employing the second membrane unit 306 passes both outputs from the second membrane unit 306 through distillation processes without requiring an intermediate solvent extraction.

Figure 4:
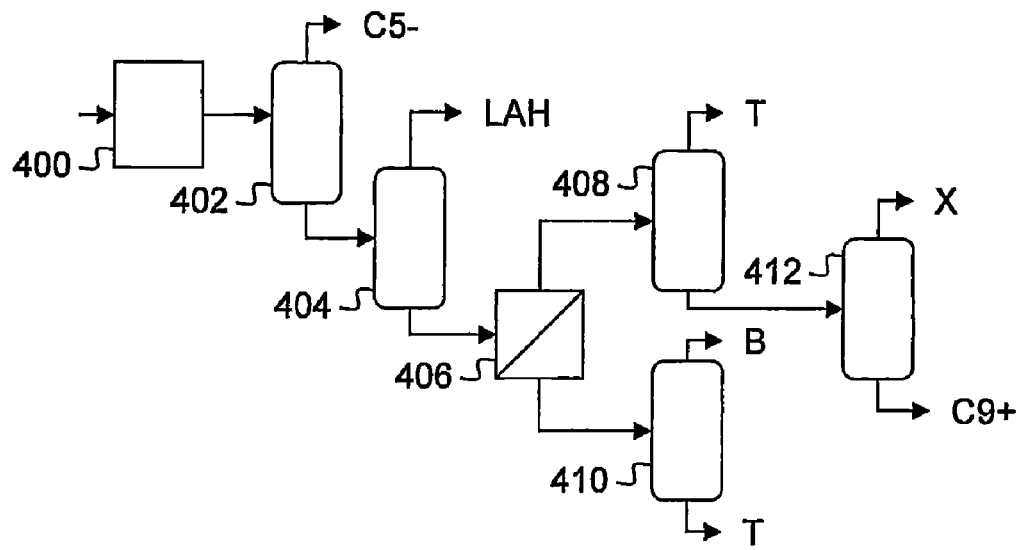
FIG. 4 is a schematic of a separation system with an aromatics extraction unit and a membrane unit configured to facilitate benzene-toluene splitting, according to one embodiment of the invention.

FIG. 4 shows a reformer 400 supplying reformate to a separation system with an alternative configuration for membrane facilitated benzene-toluene splitting. The system includes a distillation column 402, an aromatics extraction unit 404, a membrane unit 406, a TX splitter 408, a BT splitter 410, and a xylene splitter 412. Location of the membrane unit 406 in the system sequences a membrane separation process following the aromatics extraction unit 404 instead of being disposed upstream of the aromatics extraction unit 404 according to techniques used to concentrate aromatics in general.

The first distillation column 402 fractionates the reformate providing a top cut suitable for blending into a fuel or gasoline pool and a bottom cut that contains aromatics and is sent to the aromatics extraction unit 404. The aromatics extraction unit 404 employs solvent based extraction by mixing the bottom cut from the first distillation column 402 with solvent in order to produce a raffinate stream lean in aromatics for mixing with stock for the fuel or gasoline pool and an extract stream rich in aromatics relative to the raffinate stream. The extract stream from the aromatics extraction unit 404 passes through to the membrane unit 406 that produces rough cut separation of benzene from toluene.

The membrane unit 406 generates a retentate stream and a permeate stream with higher benzene content than the retentate stream. The retentate stream from the membrane unit 406 passes to the TX splitter 408 for distillation to recover overhead concentrated in toluene relative to the retentate stream. The permeate stream from the membrane unit 406 passes to the BT splitter 410 for distillation to recover overhead concentrated in benzene relative to the permeate stream. Recovery of the toluene includes combination of the overhead from the TX splitter 408 and bottom fluids recovered from the BT splitter 410. The xylene splitter 412 further processes bottom fluids recovered from the TX splitter 408 by distillation to produce overhead of xylene separated from C9+ output.

Figure 5:
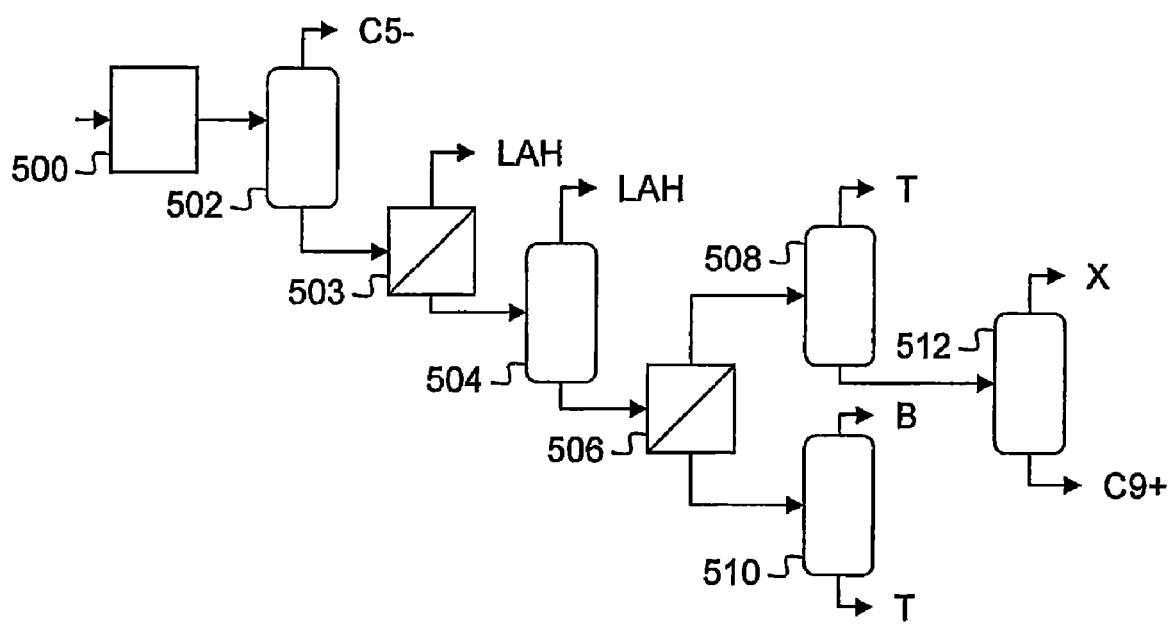
FIG. 5 is a schematic of a separation system with an aromatics extraction unit disposed between membrane units, according to one embodiment of the invention.

FIG. 5 shows a reformer 500 supplying reformate to a separation system with another alternative configuration for membrane facilitated benzene-toluene splitting. The system includes a distillation column 502, a first membrane unit 503, an aromatics extraction unit 504, a second membrane unit 506, a TX splitter 508, a BT splitter 510, and a xylene splitter 512. Location of the first and second membrane units 503, 506 in the system sequences membrane separation processes on both sides of the aromatics extraction unit 404 for limiting size and duty of both the aromatics extraction unit 504 and the BT splitter 510.

The first distillation column 502 fractionates the reformate providing a top cut suitable for blending into a fuel or gasoline pool and a bottom cut containing aromatics. The first membrane unit 503 receives the bottom cut from the distillation column 502 and produces a first permeate rich in aromatics relative to a first retentate that is suitable for mixing with stock for a fuel or gasoline pool. The aromatics extraction unit 504 employs solvent based extraction by mixing the first permeate from the first membrane unit 503 with solvent in order to produce a raffinate stream lean in aromatics for mixing with stock for the fuel or gasoline pool and an extract stream rich in aromatics relative to the raffinate stream. The extract stream from the aromatics extraction unit 504 passes through to the second membrane unit 506 that produces rough cut separation of benzene from toluene.

The second membrane unit 506 generates a second retentate stream and a second permeate stream with higher benzene content than the second retentate stream. The second retentate stream from the second membrane unit 506 passes to the TX splitter 508 for distillation to recover overhead concentrated in toluene relative to the second retentate stream. The second permeate stream from the second membrane unit 506 passes to the BT splitter 510 for distillation to recover overhead concentrated in benzene relative to the second permeate stream. Recovery of the toluene includes combination of the overhead from the TX splitter 508 and bottom fluids recovered from the BT splitter 510. The xylene splitter 512 further processes bottom fluids recovered from the TX splitter 508 by distillation to produce overhead of xylene separated from C9+ output.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method, comprising:
    passing a hydrocarbon stream through a first distillation column to separate a first fraction containing aromatics from a second fraction;
    passing the first fraction through a membrane unit to generate a retentate stream and a permeate stream with higher benzene content than the retentate stream;
    passing the retentate stream through a second distillation column to provide first fractionated outputs with one further concentrated in toluene relative to the retentate stream; and
    passing the permeate stream through a third distillation column to provide second fractionated outputs with one further concentrated in benzene relative to the permeate stream.

2. The method according to claim 1, wherein the membrane unit includes a pervaporation membrane and a nanofiltration membrane.

3. The method according to claim 1, wherein the membrane unit comprises multiple membranes with retentate from one membrane being in direct fluid communication with another membrane.

4. The method according to claim 1, wherein the hydrocarbon stream is output from a reformer and passes through the first distillation column and the membrane unit without passing through an aromatics extraction unit.

5. The method according to claim 1, wherein the hydrocarbon stream is output from a reformer.

6. The method according to claim 1, wherein vapor overhead from the second distillation column is removed to recover benzene.

7. The method according to claim 1, wherein vapor overhead from the second distillation column and an intermediate cut from the third distillation column are removed to recover benzene.

8. The method according to claim 1, wherein vapor overhead from the second distillation column is removed to recover benzene from remainder of the retentate stream including toluene and vapor overhead from the third distillation column is removed to recover components lighter than benzene from remainder of the permeate stream including benzene.

9. The method according to claim 1, wherein vapor overhead from the third distillation column is removed to recover benzene.

10. The method according to claim 1, wherein vapor overhead from the third distillation column is removed to recover benzene from toluene recovered by both liquid removal from the third distillation column and vapor overhead removal from the second distillation column.

11. The method according to claim 1, wherein the permeate stream contains about 80% aromatic content.

12. The method according to claim 1, wherein the fractionated outputs from the second and third distillation columns include vapor overheads formed of less than 20% by weight of respective ones of the retentate and permeate streams.

13. The method according to claim 1, wherein the first fraction is a top cut removed from the first distillation column.

14. The method according to claim 1, wherein the first fraction is a bottom cut removed from the first distillation column.

15. A method, comprising:
    passing a hydrocarbon stream through a first distillation column to separate a top fraction containing aromatics from a bottom fraction;
    passing the top fraction through a membrane unit to generate a retentate stream and a permeate stream with higher benzene content than the retentate stream;
    passing the retentate stream through a second distillation column for overhead removal of benzene such that remaining output of the second distillation column is further concentrated in toluene relative to the retentate stream; and
    passing the permeate stream through a third distillation column for overhead removal of components lighter than benzene such that remaining output of the third distillation column is further concentrated in benzene relative to the permeate stream.

16. The method according to claim 15, wherein a recovered benzene stream defined by the overhead removal of the benzene from the second distillation column contains at least 99% benzene by weight.

17. The method according to claim 15, wherein the first distillation column separates the top fraction of C7− from the bottom fraction of C8+.

18. A method, comprising:
    passing a hydrocarbon stream through a first distillation column to separate a bottom fraction containing aromatics from a top fraction;
    passing the bottom fraction through a membrane unit to generate a retentate stream and a permeate stream with higher benzene content than the retentate stream;
    passing the retentate stream through a second distillation column for overhead removal of toluene concentrated relative to the retentate stream due to separation from remaining output of the second distillation column; and
    passing the permeate stream through a third distillation column for overhead removal of benzene concentrated relative to the permeate stream due to separation from remaining output of the second distillation column.

19. The method according to claim 18, wherein a recovered benzene stream defined by the overhead removal of the benzene from the third distillation column contains at least 99% benzene by weight.

20. The method according to claim 18, wherein the first distillation column separates the bottom fraction of C6+ from the top fraction of C5−.

\* \* \* \* \*